(12) United States Patent
Tamura

(10) Patent No.: US 7,216,479 B2
(45) Date of Patent: May 15, 2007

(54) EXHAUST EMISSION CONTROL SYSTEM FOR VEHICLE INTERNAL COMBUSTION ENGINE

(75) Inventor: Yasuki Tamura, Nisshin (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 203 days.

(21) Appl. No.: 10/346,086

(22) Filed: Jan. 17, 2003

(65) Prior Publication Data

US 2003/0164643 A1 Sep. 4, 2003

(30) Foreign Application Priority Data

Jan. 17, 2002 (JP) ............................. 2002-009158

(51) Int. Cl.
*F01N 3/00* (2006.01)

(52) U.S. Cl. ............................. 60/285; 60/274; 60/284; 60/292; 60/324

(58) Field of Classification Search .................. 60/274, 60/284, 285, 324; 292/300; 123/329, 339.1, 123/339.11, 339.22, 339.24, 323
See application file for complete search history.

(56) References Cited

U.S. PATENT DOCUMENTS

| | | | | |
|---|---|---|---|---|
| 3,577,727 A | * | 5/1971 | Warren et al. ................ | 60/292 |
| 3,838,670 A | * | 10/1974 | King ............................ | 123/323 |
| 4,665,692 A | * | 5/1987 | Inaba ........................... | 60/324 |
| 4,987,869 A | * | 1/1991 | Hilburger ................... | 123/323 |
| 5,497,745 A | * | 3/1996 | Cullen et al. ........... | 123/339.11 |
| 6,095,116 A | * | 8/2000 | Matsushita et al. ......... | 123/350 |
| 6,109,027 A | * | 8/2000 | Schaefer ...................... | 60/324 |
| 6,321,716 B1 | * | 11/2001 | Mashiki et al. ............. | 123/295 |
| 6,557,524 B2 | * | 5/2003 | Tsunooka ................... | 123/399 |
| 6,568,175 B2 | * | 5/2003 | Izumiura et al. ............. | 60/284 |
| 6,691,675 B2 | * | 2/2004 | Kidokoro et al. ........... | 123/329 |
| 6,732,504 B2 | * | 5/2004 | Majima et al. .............. | 60/284 |
| 6,810,850 B2 | * | 11/2004 | Anderson et al. .......... | 123/323 |
| 2004/0159095 A1 | * | 8/2004 | Grieser et al. ............... | 60/284 |

FOREIGN PATENT DOCUMENTS

| | | |
|---|---|---|
| DE | 10007049 A1 | 8/2001 |
| EP | 0231463 A1 | 8/1987 |
| JP | 3-117611 A | 5/1991 |
| JP | 4-183921 A | 6/1992 |
| JP | 2001-27145 A | 1/2001 |

\* cited by examiner

*Primary Examiner*—Tu M. Nguyen
(74) *Attorney, Agent, or Firm*—Birch, Stewart, Kolasch & Birch, LLP

(57) ABSTRACT

Normally, at the time of cold-start of an internal combustion engine or the like, the flow of exhaust in an exhaust passage of the internal combustion engine is suppressed or two-stage combustion is carried out so as to promote exhaust purification in an exhaust system. However, when a correlation value of a braking force required to be generated by a vacuum type brake booster is greater than a correlation value of a braking force that can be actually generated by the vacuum type brake booster, a restricting device restricts the suppression of the exhaust flow or a two-stage combustion prohibiting device prohibits the two-combustion.

16 Claims, 4 Drawing Sheets

CLOSED STATE

OPENED STATE

EXHAUST EMISSION CONTROL SYSTEM FOR VEHICLE INTERNAL COMBUSTION ENGINE

CROSS-REFERENCE TO THE RELATED APPLICATION

This non-provisional application incorporates by reference the subject matter of Application No. 2002-9158 filed in Japan on Jan. 17, 2002, on which a priority claim is based under 35 U.S.C. §119(a).

BACKGROUND OF THE INVENTION (1) Field of the Invention

The present invention relates to an exhaust emission control system for a vehicle internal combustion engine. In particular, the present invention relates to an exhaust emission control system capable of improving an exhaust emission purifying performance while ensuring a braking force by a vacuum type brake booster.

(2) Description of the Related Art

Conventionally, an exhaust emission purifying technique utilizing reactions on a catalyst has been known as a technique for reducing harmful substances (e.g., smoke and $NO_X$ as well as unburned substances such as HC, CO, and $H_2$) in exhaust gases emitted from a vehicle internal combustion engine.

However, the exhaust emission purifying technique has the problem that harmful substances such as HC are emitted into the atmosphere before the catalyst is activated. To address this problem, a technique for promoting activation of a catalyst has been developed. For example, for a cylinder injection internal combustion engine, a two-stage combustion technique (or two-stage injection technique) has been developed which injects fuel in two stages such that sub-injection is carried out from an expansion stroke after main injection (at a lean air-fuel ratio) is carried out, and causes oxygen remaining after the main injection and unburned substances left after the sub-injected to react with each other in an exhaust system (extending from a combustion chamber to a catalytic converter), thereby reducing harmful substances or promptly activating a catalyst.

On the other hand, as disclosed in Japanese Laid-Open Patent Publication (Kokai) No. 3-117611 and Japanese Laid-Open Patent Publication (Kokai) No. 4-183921 for example, a technique has been developed which enables prompt activation of a catalyst by increasing the exhaust pressure at the time of cold-start of an engine.

Further, as disclosed in Japanese Laid-Open Patent Publication (Kokai) No. 2001-027145 for example, a technique has been developed which enables prompt activation of a catalyst at the time of cold-start of an engine by carrying out two-stage combustion and increasing the exhaust pressure (suppressing the flow of exhaust).

Incidentally, a vehicle is ordinarily equipped with a vacuum type brake booster that supplements a braking force generated by the driver. The vacuum type brake booster is capable of supplementing the braking force by utilizing negative pressure developed in an air intake system of an internal combustion engine when the vehicle is braked.

If the exhaust pressure is increased as mentioned above, however, the exhaust resistance is raised to increase the intake air volume, so that the negative pressure in the air intake system approximates the atmospheric pressure. Also, if the two-stage combustion is carried out, a throttle valve is opened in order to set the air-fuel ratio in the main injection to a lean air-fuel ratio, so that the negative pressure in the air intake system approximates the atmospheric pressure. If the negative pressure in the air intake system approximates the atmospheric pressure, it is impossible to ensure a sufficient negative pressure to be used by the vacuum type brake booster and to sufficiently supplement the braking force.

Accordingly, it may be considered that the two-stage combustion and the exhaust pressure increase (the suppression of the exhaust flow) are prohibited in the case where the detected negative pressure in the air intake system approximates the atmospheric pressure and a desired negative pressure cannot be ensured.

However, the two-stage combustion and the exhaust pressure increase (the suppression of the exhaust flow) are carried out mainly at the time of cold-start of an internal combustion engine. On this occasion, the vehicle is usually stopped, and no problem occurs even if a braking force is not sufficiently supplemented. In such a case, it is not preferred that the two-stage combustion or the exhaust pressure increase (the exhaust flow suppression) is not carried out, because harmful substances such as HC are emitted into the atmosphere to deteriorate an exhaust emission purifying performance.

It is therefore an object of the present invention to provide an exhaust emission control system for a vehicle internal combustion engine, which is capable of ensuring a braking force by a vacuum type brake booster at the time of braking and improving an exhaust emission purifying performance.

SUMMARY OF THE INVENTION

To attain the above object, the present invention provides an exhaust emission control system for a vehicle internal combustion engine, comprising: an exhaust purification promoting device for promoting purification of exhaust emitted from the internal combustion engine such that negative pressure developed in the air intake system of the internal combustion engine approximates the atmospheric pressure; an actual braking force correlation value detecting device for detecting a correlation value of an actual braking force that can be actually generated by a vacuum type brake booster; a required braking force correlation value detecting device for detecting a required braking force correlation value of a required braking force required to be generated by the vacuum type brake booster; and a restricting device for restricting the exhaust emission purification promoting operation of the exhaust emission purification promoting device when the correlation value of the required braking force detected by the required braking force correlation value detecting device is greater than the correlation value of the actual braking force detected by the actual braking force correlation value detecting device.

Specifically, when the exhaust purification promoting device carries out the exhaust purification promoting operation, the negative pressure developed in the air intake system of the internal combustion engine approximates the atmospheric pressure while the purification of exhaust is promoted. However, if the correlation value of the required braking force detected by the required braking force correlation value detecting device is greater than the correlation value of the actual braking force detected by the actual braking force correlation value detecting device, the restricting device restricts the exhaust emission purification promoting operation of the exhaust emission purification promoting device.

Therefore, if the correlation value of the required braking force required to be generated by the vacuum type brake booster is greater than the correlation value of the actual braking force that can be generated by the vacuum type brake booster, the negative pressure in the air intake system of the internal combustion engine is ensured to sufficiently supplement the braking force by the vacuum type brake booster. On the other hand, if the correlation value of the required braking force required to be generated by the vacuum type brake booster is equal to or less than the correlation value of the actual braking force that can be generated by the vacuum type brake booster, for example, if the vehicle is stopped on a flat road at the time of cold-start of the engine, the exhaust purification by the exhaust purification promoting device is promoted in a favorable manner because the required braking force is small and the necessity for ensuring negative pressure in the air intake system of the internal combustion engine is not great.

In one preferred form of the present invention, the exhaust emission purifying promoting device is an exhaust flow control device for promoting purification of exhaust by suppressing the flow of exhaust in an exhaust passage of the internal combustion engine.

In this case, at the time of cold-start of the internal combustion engine or the like, the purification of exhaust is promoted by suppressing the flow of exhaust in the exhaust passage of the internal combustion engine, but if the correlation value of the required braking force detected by the required braking force required to be generated by the vacuum type brake booster is greater than the correlation value of the actual braking force that can be generated by the vacuum type brake booster, the restricting device restricts the suppression of the exhaust flow.

Therefore, if the correlation value of the required braking force required to be generated by the vacuum type brake booster is greater than the correlation value of the actual braking force that can be generated by the vacuum type brake booster, the negative pressure in the air intake system of the internal combustion engine is ensured to sufficiently supplement the braking force by the vacuum type brake booster without causing an increase in the intake air volume. On the other hand, if the correlation value of the required braking force required to be generated by the vacuum type brake booster is equal to or less than the correlation value of the actual braking force that can be generated by the vacuum type brake booster, for example, if the vehicle is stopped on a flat road at the time of cold-start of the engine, the flow of exhaust is suppressed to cause oxidative reaction in an exhaust system to proceed, promoting the purification of exhaust in a favorable manner because the required braking force is small and the necessity for ensuing negative pressure in the air intake system of the internal combustion engine is not great. Further, causing the oxidative reaction to proceed increases the exhaust gas temperature, thus realizing the prompt activation of a catalytic converter placed in the exhaust passage.

It is a further preferred form of the present invention, that the internal combustion engine is a cylinder injection type internal combustion engine, and the exhaust emission purification promoting device is a two-stage combustion device for supplying fuel into a combustion chamber such that main injection for main combustion is carried out in an intake stroke or in a compression stroke, and sub-injection is carried out from an expansion stroke, thereby increasing an exhaust gas temperature to promote exhaust purification.

In this case, at the time of cold-start of the cylinder injection type internal combustion engine or the like, the two-stage combustion is carried out to emit HC (hydrocarbon) and surplus $O_2$ (surplus oxygen) remaining after the main combustion (stratified combustion) into the exhaust system and cause oxidative reaction thereof in the exhaust system, promoting the purification of exhaust. On the other hand, if the correlation value of the required braking force required to be generated by the vacuum type brake booster is greater than the correlation value of the actual braking force that can be generated by the vacuum type brake booster, the restricting device restricts the two-stage combustion.

Therefore, if the correlation value of the required braking force required to be generated by the vacuum type brake booster is greater than the correlation value of the actual braking force that can be generated by the vacuum type brake booster, the negative pressure in the air intake system of the internal combustion engine is ensured to sufficiently supplement the braking force by the vacuum type brake booster without causing a throttle valve to open. On the other hand, if the correlation value of the required braking force required to be generated by the vacuum type brake booster is equal to or less than the correlation value of the actual braking force that can be generated by the vacuum type brake booster, for example, if the vehicle is stopped on a flat road at the time of cold-start of the engine, the two-stage combustion is carried out to cause oxidative reaction to proceed in the exhaust system, because the required braking force is small and the necessity for ensuring negative pressure in the air intake system of the internal combustion engine is not great. This promotes the purification of exhaust in a favorable manner. Further, causing the oxidative reaction to proceed increases the exhaust gas temperature, thus realizing the prompt activation of the catalytic converter placed in the exhaust passage.

In a still further preferred form of the present invention, the exhaust emission control system further includes a slight lean operating device for carrying out a compression slight lean operation, in which fuel is supplied into the combustion chamber such that an air-fuel ratio is a slight lean air-fuel ratio, in the compression stroke, thereby increasing the exhaust gas temperature to promote exhaust purification, and the restricting device prohibits the two-stage combustion device from carrying out the two-stage combustion and causes the slight lean operation device to carry out the compression slight lean operation.

Therefore, if the required braking force correlation value is greater than the actual braking force correlation value, the two-stage combustion is prohibited, so that the braking force is sufficiently supplemented by ensuring the negative pressure in the air intake system of the internal combustion engine without causing the throttle valve to open. In this case, it is conceivable that a braking force is required when the vehicle lies, for example, on a downslope even at the time of cold-start of the engine, and under such a circumstance, the compression slight lean operation is carried out to cause CO (carbon monoxide) and surplus $O_2$ (surplus oxygen) remaining after the stratified combustion to be emitted into the exhaust system while ensuring the negative pressure in the air intake system of the internal combustion engine, causing oxidative reaction to proceed. This promotes the purification of exhaust in a relatively favorable manner while sufficiently supplementing the braking force.

BRIEF DESCRIPTION OF THE DRAWINGS

The nature of this invention, as well as other objects and advantages thereof, will be explained in the following with reference to the accompanying drawings, in which like reference character designate the same or similar parts throughout the figure and wherein.

DESCRIPTION OF THE PREFERRED EMBODIMENT

The present invention will now be described in detail with reference to the accompanying drawings showing preferred embodiments thereof.

Figure 1:
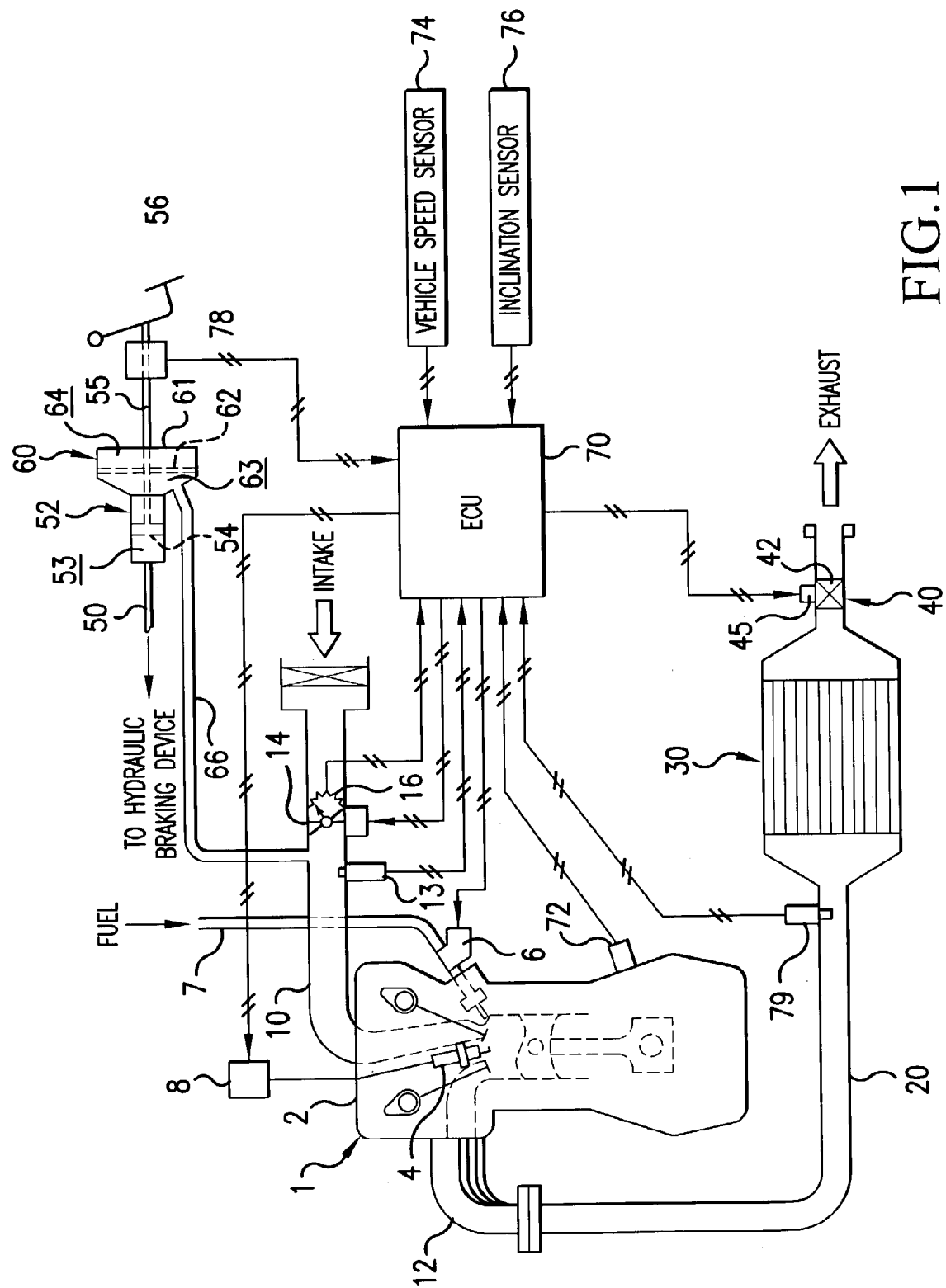
FIG. 1 is a schematic diagram showing an arrangement of an exhaust emission control system for a vehicle internal combustion engine according to the present invention.

FIG. 1 is a schematic diagram showing the arrangement of an exhaust emission control system for a vehicle internal combustion engine according to the present invention. A description will be given of the arrangement of the exhaust emission control system with reference to FIG. 1.

As shown in FIG. 1, a cylinder injection type spark ignition gasoline engine is employed as an engine body 1 (hereinafter referred to as an "engine") serving as a vehicle internal combustion engine. This cylinder injection type engine 1 is capable of injecting fuel during an intake stroke (intake stroke injection) and injecting fuel during a compression stroke (compression stroke injection) by switching the fuel injection mode. The engine 1 is capable of easily operating at a stoichiometric air-fuel ratio, a rich air-fuel ratio (rich air-fuel ratio operation), and a lean air-fuel ratio (lean air-fuel ratio operation).

As shown in FIG. 1, an ignition plug 4 and an electro-magnetic type fuel injection valve 6 are attached to a cylinder head 2 of each cylinder of the engine 1. The fuel injection valve 6 is capable of injecting fuel directly into a combustion chamber.

An ignition coil 8, which outputs a high voltage, is connected to the ignition plug 4. A fuel supply device, not shown, including a fuel tank is connected to the fuel injection valve 6 via a fuel pipe 7. In further detail, the fuel supply device is provided with a low-pressure fuel pump and a high-pressure fuel pump to supply fuel stored in the fuel tank to the fuel injection valve 6 at a low fuel pressure or a high fuel pressure, and injecting the fuel from the fuel injection valve 6 into the combustion chamber at a desired fuel pressure.

The cylinder head 2 of each cylinder is formed with an intake port extending in a substantially vertical direction, and one end of an intake manifold 10 is connected to each intake port such that it is in communication with each intake port. The intake manifold 10 is provided with an electromagnetic throttle valve 14 that controls the intake air volume, and a throttle position sensor (TPS) 16 that detects a throttle angle. The intake manifold 10 is also provided with an intake negative pressure sensor 13, which detects the manifold air pressure downstream of the throttle valve 14 in the intake manifold 10.

The cylinder head 2 of each cylinder is formed with an exhaust port in a substantially horizontal direction, and one end of an exhaust manifold 12 is connected to each exhaust port such that it is in communication with each exhaust port.

Note that the cylinder injection type engine 1 has been known, and therefore, a detailed description of the structure thereof is omitted.

An exhaust pipe (exhaust passage) 20 is connected to the other end of the exhaust manifold 12, and a three-way catalyst (catalytic converter) 30, as an exhaust purifying catalyst device, is placed in the exhaust pipe 20. A carrier of the three-way catalyst 30 contains copper (Cu), cobalt (Co), argentum (Ag), platinum (Pt), rhodium (Rh), or palladium (Pd) as an active noble metal.

Further, an exhaust flow control device 40 is placed downstream of the three-way catalyst 30 in the exhaust pipe 20.

The exhaust flow control device 40 is intended to promote a reduction in harmful substances (e.g. NOx, smoke, $H_2$, etc. as well as unburned substances such as HC and CO) in exhaust gases, and is capable of changing at least one of the exhaust pressure, exhaust density, and exhaust flow rate (reduction effect promoting factors). Specifically, the exhaust flow control device 40 is comprised of a sealed opening and closing valve (exhaust flow control device) 42 that is capable of controlling the area of passage in the exhaust pipe 20.

With this arrangement, if the sealed opening and closing valve 42 is operated to restrict the area of passage in the case where the three-way catalyst 30 has not yet been activated, for example, at the time of the cold-start of the engine 1, an oxidative reaction proceeds in an exhaust system to promote the purification of exhaust emission.

Figure 2A:
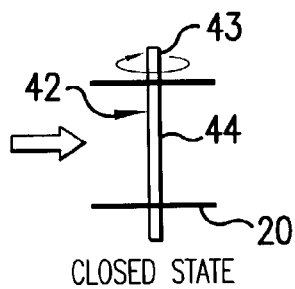
FIGS. 2(a) and 2(b) are diagrams showing a butterfly valve as an exhaust flow control device.
Figure 2B:
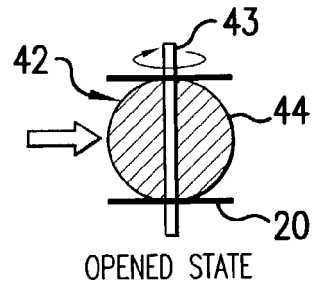

Various types of valves may be employed as the sealed opening and closing valve 42, but in this example, a butterfly valve is employed which is capable of controlling the area of passage in the exhaust pipe 20 by rotating a valve body 44 about a shaft 43 penetrating through the exhaust pipe 20 as viewed in FIG. 2(a) that shows a valve closed state and FIG. 2(b) that shows a valve opened state. The butterfly valve is provided with an actuator 45, and the actuator 45 rotates the valve body 44 of the butterfly valve 44 about the shaft 43 to open and close the butterfly valve 44.

Further, a vehicle is provided with a hydraulic braking device, not shown, which is connected to an oil pressure chamber 53 in a master cylinder 52 via an oil pressure pipe 50 such that it is in communication with the oil pressure chamber 53. On the other hand, a brake pedal 56 is connected to a hydraulic piston 54, which slides in the master cylinder 52, via a push rod 55.

With this arrangement, when the driver depresses the brake pedal 56, the hydraulic piston 54 is pressed via the push rod 55 to discharge hydraulic fluid in the oil pressure chamber 53, and the hydraulic braking device generates a braking force according to the oil pressure of the discharged high-pressure hydraulic fluid.

Further, a vacuum type brake booster 60, as a brake power assist, is provided between the master cylinder 52 and the brake pedal 56. The vacuum type brake booster 60 is comprised of an outer shell 61 and a diaphragm 62 that is integrated with the push rod 55, and a space inside the outer shell 61 is partitioned into two chambers by the diaphragm 62. Specifically, the vacuum type brake booster 60 is formed with a vacuum chamber 63 at the side of the hydraulic piston 54 and an atmosphere chamber 64 at the side of the brake booster 60. A vacuum pipe 66 extends from the vacuum type brake booster 60, and the vacuum pipe 66 is connected to the intake manifold 10 such that the vacuum chamber 63 is in communication with the inner part of the intake manifold 10. Namely, the vacuum type brake booster 60 receives an manifold air pressure (a lower pressure than the atmospheric pressure) from the intake manifold 10 via the vacuum pipe 66 to make the pressure inside the vacuum chamber 63 negative, and the negative pressure moves the diaphragm 62 toward the vacuum chamber 63 to push the push rod 55.

With this arrangement, when the driver depresses the brake pedal 56, the force of the vacuum brake booster 60 is added to the stepping force of the driver to considerably increase the oil pressure of the hydraulic fluid in the master cylinder 52, so that the hydraulic braking device exerts a sufficient braking force.

Note that the vacuum type brake booster 60 has been known, and therefore, a detailed description thereof is omitted.

An ECU 70 is comprised of an input/output device, a storage device (a ROM, a RAM, and a nonvolatile RAM), a central processing unit (CPU), a timer counter, and so forth. The ECU 70 controls the overall operations of the exhaust emission control system including the engine 1.

A variety of sensors such as a crank angle sensor 72 that detects the crank angle of the engine 1, a vehicle speed sensor 74 that detects the vehicle speed V, an inclination sensor 76 that detects the inclination θ of a vehicle body in a longitudinal direction of the vehicle, a stroke sensor 78 that detects the stroke BPST of the brake pedal 56, and an $O_2$ sensor 79 as well as the above-mentioned intake pressure sensor 13 and TPS 16 are connected to the input side of the ECU 70 so that information detected by these sensors can be inputted to the ECU 70. It should be noted that the engine speed Ne is calculated based on the crank angle detected by the crank angle sensor 72.

On the other hand, the above-mentioned variety of output devices such as the fuel injection valve 6, ignition coil 8, throttle vale 14, and actuator 45 are connected to the output side of the ECU 70. The fuel injection quantity, fuel injection timing, ignition timing, exhaust flow controlled variable, and so forth, calculated based on the information detected by the sensors, are outputted to the respective output devices, so that the fuel injection valve 6 injects a proper quantity of fuel in proper timing, the ignition plug 4 performs spark ignition in proper timing, and the operating condition of the opening and closing valve 42 is properly controlled to achieve a desired exhaust flow controlled variable (e.g., a target exhaust pressure).

Further, the fuel injection valve 6 has a function of injecting fuel in at two stages, i.e., performing main injection for main combustion and then performing sub-injection from the later stage of an expansion stroke to carry out two-stage combustion (two-stage combustion device). In the two-stage combustion, the main injection is carried out during the compression stroke, and the air-fuel ratio in the main combustion is set to a lean air-fuel ratio at which the quantity of oxygen ($O_2$) is large.

The above described two-stage combustion enables surplus oxygen (surplus $O_2$) remaining after the main combustion and unburned substances (e.g., HC and CO) remained in the sub-injection to exist at the same time in the exhaust system (from the combustion chamber to the three-way catalyst). For example, in the case where the three-way catalyst 30 has not yet been activated, for example, at the time of cold-start of the engine 1, the surplus $O_2$ and the unburned substances such as HC and CO react with each other to promote the purification of exhaust emission and promptly activate the three-way catalyst 30.

A description will now be given of the operation of the exhaust emission control system according to the present invention constructed as described above.

First, a description will be given of a first embodiment of the present invention with reference to FIG. 3.

Figure 3:
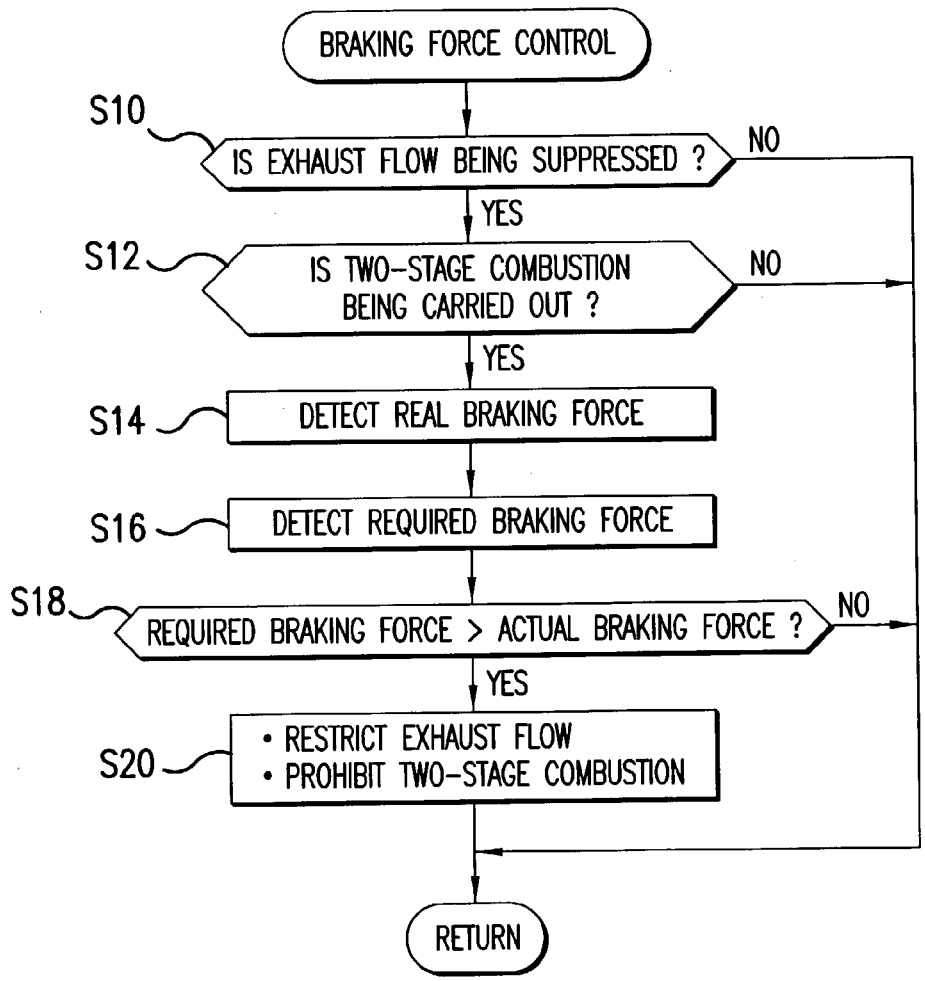
FIG. 3 is a flow chart showing a braking force control routine according to a first embodiment of the present invention.

FIG. 3 is a flow chart showing a braking force control routine according to the first embodiment of the present invention.

In Step S10, it is determined whether the exhaust flow is being suppressed or not. Specifically, it is determined whether the sealed opening and closing valve 42 is being operated to restrict the area of passage in the exhaust pipe 20 or not. If the determination result is No, the routine is brought to an end without doing anything. If the determination result is Yes, i.e., if it is determined that the sealed opening and closing valve 42 is being operated to restrict the area of passage, for example, at the time of cold-start of the engine 1, the process proceeds to Step S12.

In Step S12, it is determined whether the two-stage combustion is being carried out or not. Specifically, it is determined whether or not the sub-injection of fuel is carried out from the later stage of the expansion stroke after the main injection for the main combustion is carried out (the air-fuel ratio is set to a lean air-fuel ratio). If the determination result is No, the routine is brought to an end without doing anything further. On the other hand, if the determination result is Yes, i.e., if the two-stage combustion is being carried out, for example, at the time of cold-start of the engine 1, the process proceeds to Step S14.

In Step S14, an actual braking force (actual braking force correlation value), which can be generated by the vacuum type brake booster 60, is detected (actual braking force correlation value detecting device). Specifically, a braking force that can be added by the vacuum type brake booster 60 at the present moment is detected.

Figure 4:
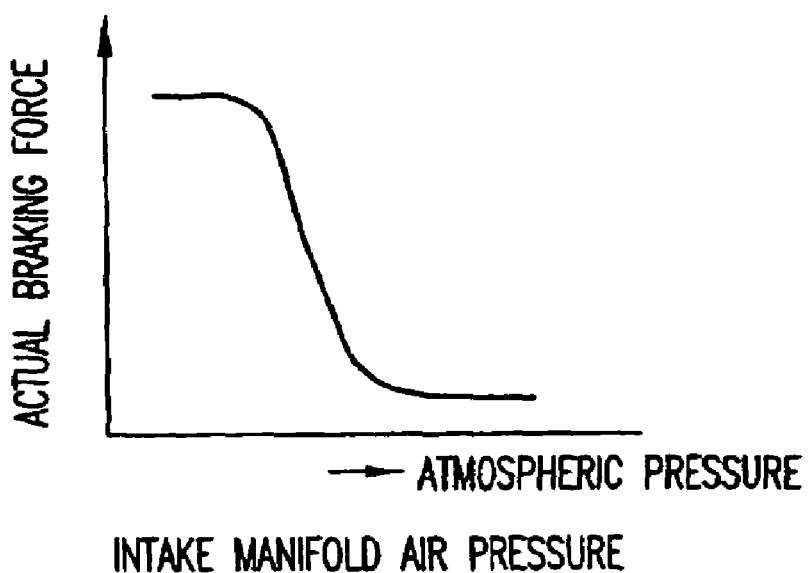
FIG. 4 is a map showing the relation between the actual braking force generated by a vacuum type brake booster and the manifold air pressure (negative pressure inside an intake manifold)

In this example, as shown in FIG. 4, the relation between the actual braking force generated by the vacuum type brake booster 60 and the manifold air pressure (the negative pressure inside the intake manifold where the manifold air pressure<the atmospheric pressure) is set in advance and represented on a map by conducting experiments or the like, and the actual braking forced is read from the map in accordance with the manifold air pressure detected by the intake pressure sensor 13.

In Step 16, a required braking force (required braking force correlation value) is detected (required braking force correlation value detecting device). Specifically, a braking force required to be generated by the vacuum type brake booster 60 at the present moment is detected.

Figure 5:
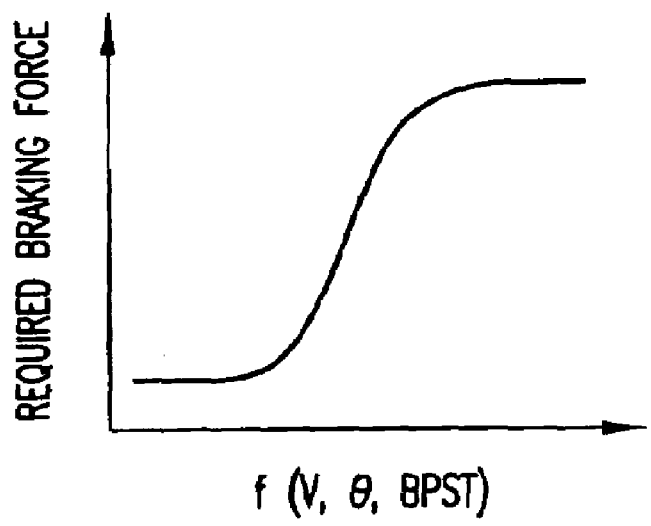
FIG. 5 is a map showing the relation between the required braking force and f (V, θ, BPST)

The required braking force is determined according to functions f(V, θ, BPST) of the vehicle speed V, the inclination θ of the vehicle in the longitudinal direction thereof, and the stroke BPST of the brake pedal 6. In this example, the relation between the required braking force and f(V, θ, BPST) is set in advance and represented on a map, as shown in FIG. 5, by conducting experiments or the like. The required braking force is read from the map according to the functions f(V, θ, BPST) of the vehicle speed V outputted from the vehicle speed sensor 74, the inclination θ outputted from the inclination sensor 76, and the stroke BPST outputted from the stroke sensor 78. Although in this example, the required braking force is determined according to the functions f(V, θ, BPST) of the vehicle speed V, the inclination θ of the vehicle in the longitudinal direction thereof, and the stroke BPST of the brake pedal 6, the present invention is not limited to this, but the required braking force may be determined according to a function of any one of the vehicle speed V, the inclination θ, and the stroke BPST.

In Step S18, the required braking force and the actual braking force, which are found in the above-mentioned manner, are compared with each other to determine whether the required braking force is greater than the actual braking force or not. If the determination result is Yes, i.e., if the required braking force is greater than the actual braking force (the required braking force>the actual braking force), the process proceeds to Step S20.

In the Step S20, the suppression of the exhaust flow is restricted (restricting device) and the two-stage combustion is prohibited (two-stage combustion prohibiting device) for the reason that the required braking force is greater than the actual braking force. Specifically, the restriction by the sealed opening and closing valve 42 is reduced or the sealed opening and closing valve 42 is opened so as to restrict the suppression of the exhaust flow and prohibit the sub-injection of fuel from the later stage of the expansion stroke.

In the case where the suppression of the exhaust flow is not restricted (the flow of exhaust is suppressed), the manifold air pressure inside the intake manifold 10 approximates the atmospheric pressure with an increase in the exhaust pressure, and therefore, a sufficient manifold air pressure cannot be ensured. By restricting the suppression of the exhaust flow as in Step S20, however, it is possible to sufficiently supplement the braking force by the vacuum type brake booster 60.

Further, in the case where the two-stage combustion is carried out, the throttle valve 14 is brought into a substantially fully open condition because the air-fuel ratio for the main combustion is set to the lean air-fuel ratio, and the manifold air pressure inside the intake manifold 10 approximates the atmospheric pressure with an increase in the exhaust pressure to make it impossible to ensure a sufficient manifold air pressure. By prohibiting the two-stage combustion as in Step S20, however, it is possible to ensure a sufficient manifold air pressure without opening the throttle valve 14 and to sufficiently supplement the braking force by the vacuum type brake booster 60 as mentioned above.

On the other hand, if the determination result is No in Step S18, i.e., if it is determined in Step S18 that the required braking force is not greater than the actual braking force, the routine is brought to an end without doing anything further. Specifically, if the required braking force is not greater than the actual braking force, the suppression of the exhaust flow is carried out without restriction and the two-stage combustion is carried out without prohibition. This causes oxidative reaction to proceed in the exhaust system and promotes the purification of exhaust emission, thus promptly activating the three-way catalyst 30.

Specifically, according to the present invention, if the required braking force required to be generated by the vacuum type brake booster 60 is greater than the actual braking force that can be generated by the vacuum type brake booster 60, the suppression of the exhaust flow is restricted and the two-stage combustion is prohibited to ensure the braking force generated by the vacuum type brake booster 60. On the other hand, if the required braking force is not greater than the actual braking force, the exhaust flow is suppressed and the two-stage combustion is carried out by priority even if the manifold air pressure detected by the intake pressure sensor 13 approximates the atmospheric pressure.

Therefore, only in the case where a relatively great braking force is required, the suppression of the exhaust flow is restricted and the two-stage combustion is prohibited to ensure the braking force generated by the vacuum type brake booster 60, and on the other hand, in the case where no braking force is required, for example, at the time of cold-start of the engine 1 when the vehicle is stopped on a flat road, the flow of exhaust is suppressed and the two-stage combustion is surely carried out to proceed oxidative reaction in the exhaust system and promote the purification of exhaust emission, thus promptly activating the three-way catalyst 30.

Incidentally, when the two-stage combustion is prohibited in the above-mentioned Step S20, a compression slight lean operation, in which fuel is injected in the compression stroke such that the air-fuel ratio is set to a slight lean air-fuel ratio (e.g., a value 15), may be carried out as an alternative to the two-stage combustion (slight lean operation device).

This enables CO and surplus $O_2$ remaining after stratified combustion to be emitted into the exhaust system while ensuring the negative pressure in the air intake system of the engine 1, thus causing oxidative reaction to proceed in the exhaust system. For example, in the case where a braking force is required at the time of cold-start of the engine 1 when the vehicle lies on a downslope, the purification of exhaust emission can be promoted in a relatively preferable manner while sufficiently supplementing the braking force.

A description will now be given of a second embodiment of the present invention with reference to FIG. 6.

Figure 6:
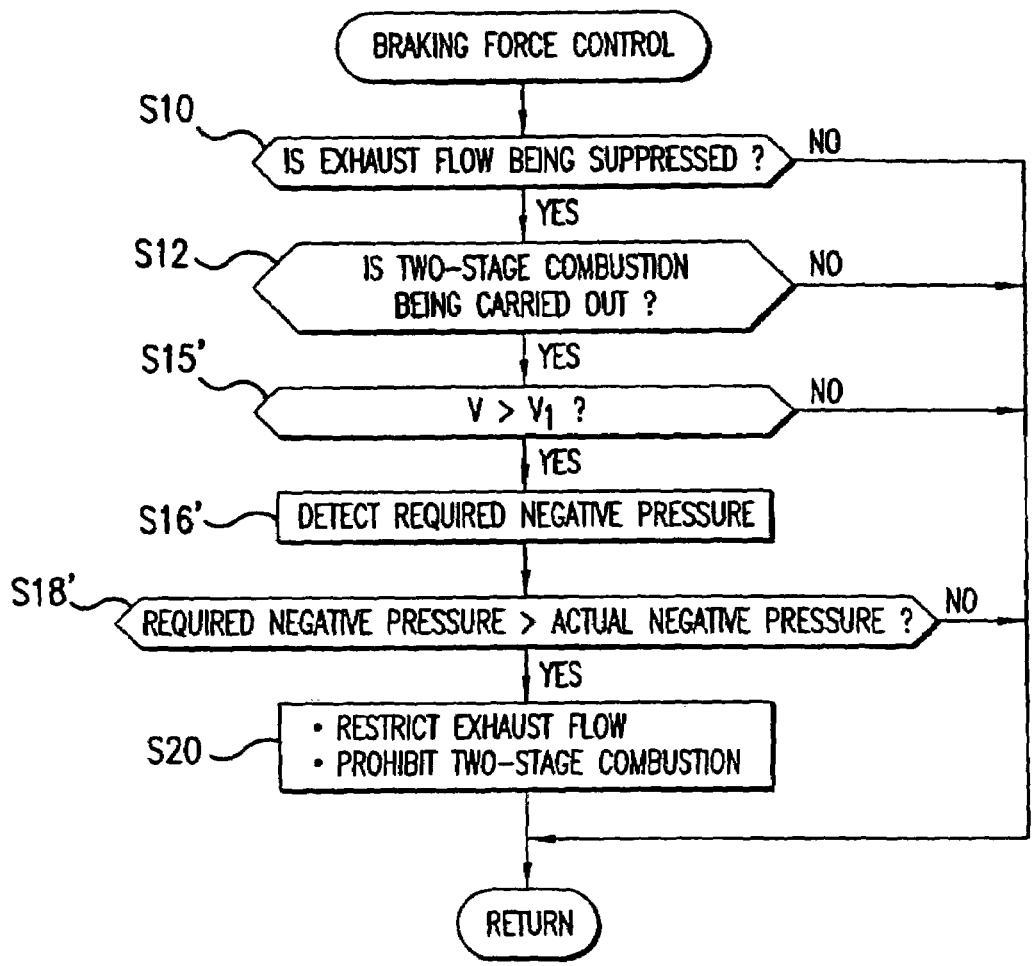
FIG. 6 is a flow chart showing a braking force control routine according to a second embodiment of the present invention.

FIG. 6 is a flow chart showing a braking force control routine according to the second embodiment of the present invention. Elements and parts of FIG. 6 corresponding to those of the first embodiment, i.e., the same steps as those in FIG. 3 are denoted by the same reference numerals, and a description thereof is omitted. A description will be given only with respect to portions different from the first embodiment.

If it is determined in Steps S10 and S12 that the exhaust flow is being suppressed and the two-combustion is being carried out, the process proceeds to Step S15'.

It is determined in Step S15' whether the vehicle speed V is greater than a predetermined vehicle speed V1 or not. Namely, whether the required braking force is great or not is determined according to the vehicle speed V. Although in this example, whether the required braking force is great or not is determined according to the vehicle speed V, the present invention is not limited to this, but whether the required braking force is great or not may be determined according to whether the inclination θ is greater than a predetermined inclination θ1 or not, or whether the stroke BPST is greater than a predetermined stroke BPST1. If the determination result is Yes in Step S15', i.e., if it is determined in Step S15' that the vehicle speed V is greater than the predetermined vehicle speed V1, it is determined that the required braking force is great, and the process proceeds to Step S16'.

In Step S16', the required negative pressure required for the vacuum type brake booster 60 (required braking force correlation value) is detected (required braking force correlation value detecting device).

Figure 7:
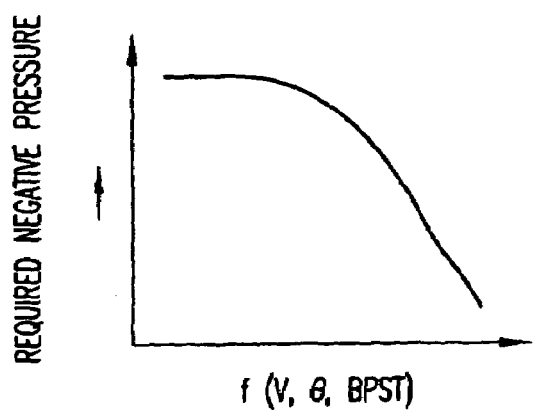
FIG. 7 is a map showing the relation between the required negative pressure and f (V, θ, BPST).

Similarly to the first embodiment, the required negative pressure is determined according to functions f(V, θ, BPST) of the vehicle speed V, the inclination θ of the vehicle in the longitudinal direction thereof, and the stroke BPST of the brake pedal 56. In this example, as shown in FIG. 7, the relation between the required negative pressure and f(V, θ, BPST) is set and represented on a map in advance by conducting experiments or the like. The required negative pressure is read from the map according to the functions f(V, θ, BPST) of the vehicle speed V outputted from the vehicle speed sensor 74, the inclination θ outputted from the inclination sensor 76, and the stroke BPST outputted from the stroke sensor 78. Although in this example, the required negative pressure is determined according to the functions f(V, θ, BPST) of the vehicle speed V, the inclination θ of the vehicle in the longitudinal direction thereof, and the stroke BPST of the brake pedal 56, the present invention is not limited to this, but the required negative pressure may be determined according to any one function of the vehicle speed V, the inclination θ, or the stroke BPST.

Incidentally, since it has been determined in Step S15' that the required braking force is great, the required negative pressure may be a predetermined value set in advance.

In Step S18', the required negative pressure found in the above-mentioned manner is directly compared with the manifold air pressure detected by the intake pressure sensor (actual braking force correlation value detecting device) 13, i.e., the actual negative pressure (actual braking force correlation value) to determine whether the absolute value of the required negative pressure greater than the absolute value of the actual negative pressure or not. If the determination result is True (Yes), i.e., if it is determined that the absolute value of the required negative pressure is greater than the absolute value of the actual negative pressure (|required negative pressure|>|actual negative pressure|), the process proceeds to Step S20 wherein the suppression of the exhaust flow is restricted and the two-stage combustion is prohibited.

Therefore, if the vehicle speed V is greater than the predetermined vehicle speed V1 and the required braking force is great to such an extent that the absolute value of the required negative pressure is greater than the absolute value of the actual negative pressure, a sufficient manifold air pressure can be ensured to sufficiently supplement the braking force by the vacuum type brake booster 60.

On the other hand, if the determination result is No in Step S15', i.e., if it is determined in Step S15' that the vehicle speed is not greater than the predetermined vehicle speed V1, that is, the required braking force is small, or in the case where the determination result is No in Step S15', i.e., if it is determined in Step S15' that the absolute value of the required negative pressure not greater than the absolute value of the actual negative pressure, the routine is brought to an end without doing anything further. Specifically, if the required braking force is small or if the absolute value of the required negative pressure is not greater than the absolute value of the actual negative pressure, the suppression of the exhaust flow is carried out without restriction and the two-stage combustion is carried out without prohibition. This causes oxidative reaction to progress in the exhaust system and promotes the purification of exhaust emission, thus promptly activating the three-way catalyst 30.

Therefore, according to the second embodiment, only in the case where a relatively great braking force is required, the suppression of the exhaust flow is restricted and the two-stage combustion is prohibited to ensure the braking force generated by the vacuum type brake booster 60, and on the other hand, in the case where no braking force is required, for example, at the time of cold-start of the engine 1 when the vehicle is stopped on a flat road, the exhaust flow is suppressed and the two-stage combustion is surely carried out to cause oxidative reaction to proceed in the exhaust system, thus promoting the purification of exhaust emission and promptly activating the three-way catalyst 30.

Incidentally, in the second embodiment, when the two-stage combustion is prohibited in the above-mentioned Step S20, a compression slight lean operation in which fuel is injected in the compression stroke such that the air-fuel ratio is set to a slight lean air-fuel ratio (e.g., a value 15) may be carried out as an alternative to the two-stage combustion, as is the case with the above described first embodiment.

It should be understood that the present invention is not limited to the embodiments disclosed, but various variations of the above described embodiment may be possible without departing from the spirits of the present invention, including variations as described below, for example.

Although in the above described embodiments, the manifold air pressure is detected by the intake pressure sensor 13, but the negative pressure in the vacuum chamber 63 of the vacuum type brake booster 60 may be detected, or the manifold air pressure may be estimated from the throttle angle and the engine speed Ne.

Further, although in the above described embodiments, both the suppression of the exhaust flow and the two-stage combustion are restricted or prohibited, but only one of the suppression of the exhaust flow and the two-stage combustion may be restricted or prohibited.

Further, although in the above described embodiments, both the suppression of the exhaust flow and the two-stage combustion are carried out, for example, at the time of cold-start of the engine 1, only the suppression of the exhaust flow may be carried out or only the two-stage combustion may be carried out.

Further, although in the above described embodiment, the cylinder injection type gasoline engine is employed as the engine 1, a diesel engine may be employed as the engine 1 or an intake pipe injection type gasoline engine may be employed in the case where only the suppression of the exhaust flow is carried out.

Further, although in the above described embodiment, the three-way catalyst 30 is employed as the catalyst, any type of catalyst such as a lean $NO_x$ catalyst or an HC absorption catalyst may be employed.

What is claimed is:

1. A brake control method for an exhaust emission control system for a vehicle internal combustion engine, the internal combustion engine being adapted to supply fuel into a combustion chamber during an expansion stroke to increase an exhaust gas temperature to promote exhaust purification, comprising:

detecting an actual brake force correlation value of an actual braking force that can be actually generated by a vacuum brake booster;

determining a required braking force correlation value of a required braking force required to be generated by the vacuum brake booster based on at least one of a vehicle inclination and a stroke of a brake pedal depressed by a driver; and restricting an exhaust emission purification promoting operation of an exhaust emission purification promoting device for promoting purification of exhaust emitted from the internal combustion engine, by controlling an opening and closing valve provided in an exhaust passage for selectively controlling an amount of flow of an exhaust in an exhaust passage, such that negative pressure developed in an air intake system of the internal combustion engine approximates an atmospheric pressure, and the supply of fuel during the expansion stroke, when the correlation value of the determined required braking force is greater than the correlation value of the actual braking force.

2. The brake control method according to claim 1, wherein the determining step includes the step of
continuously varying the required braking force correlation value as said at least one of the vehicle inclination and the stroke of a brake pedal depressed by a driver changes.

3. An exhaust emission control system for a vehicle internal combustion engine, the internal combustion engine being adapted to supply fuel into a combustion chamber during an expansion stroke to increase an exhaust gas temperature to promote exhaust purification, comprising:
a vacuum brake booster that supplements a vehicle braking force by utilizing negative pressure developed in an air intake system of the internal combustion engine;
an exhaust purification promoting device for promoting purification of exhaust emitted from the internal combustion engine such that the negative pressure developed in the air intake system of the internal combustion engine approximates an atmospheric pressure, said exhaust purification promoting device including an opening and closing valve provided in an exhaust passage for selectively controlling an amount of flow of an exhaust gas in the exhaust passage; and
a restricting device for restricting the supply of fuel during the expansion stroke and the exhaust emission purification promoting operation of said exhaust emission purification promoting device when a correlation value of a required braking force determined based on at least one of a vehicle inclination and a stroke of a brake pedal depressed by a driver is greater than a correlation value of an actual braking force.

4. An exhaust emission control system for a vehicle internal combustion engine according to claim 3, wherein the required braking force correlation value continuously varies as said at least one of the vehicle inclination and the stroke of a brake pedal depressed by a driver changes.

5. An exhaust emission control system for a vehicle internal combustion engine, the internal combustion engine being adapted to supply fuel into a combustion chamber during an expansion stroke to increase an exhaust gas temperature to promote exhaust purification, comprising:
a vacuum brake booster that supplements a vehicle braking force by utilizing negative pressure developed in an air intake system of the internal combustion engine;
an exhaust purification promoting device for promoting purification of exhaust emitted from the internal combustion engine such that the negative pressure developed in the air intake system of the internal combustion engine approximates an atmospheric pressure, said exhaust purification promoting device including an opening and closing valve provided in an exhaust passage for selectively controlling an amount of flow of an exhaust in the exhaust passage; an actual braking force correlation value detecting device for detecting a correlation value of an actual braking force that can be actually generated by the vacuum brake booster;
a required braking force correlation value determining device for determining a required braking force correlation value of a required braking force required to be generated by the vacuum brake booster based on at least one of a vehicle inclination and a stroke of a brake pedal depressed by a driver; and
a control unit for restricting the supply of fuel during the expansion stroke and the exhaust emission purification promoting operation of said exhaust emission purification promoting device by controlling the opening and closing device when the correlation value of the required braking force determined by said required braking force correlation value determining device is greater than the correlation value of the actual braking force detected by said actual braking force correlation value detecting device.

6. An exhaust emission control system for a vehicle internal combustion engine according to claim 5, wherein said actual braking force correlation value detecting device detects the correlation value of the actual braking force based on a magnitude of an actual negative pressure developed in the air intake system of the internal combustion engine.

7. An exhaust emission control system for a vehicle internal combustion engine according to claim 5, wherein said actual braking force correlation value determining device determines the correlation value of the actual braking force from a map based on a magnitude of an actual negative pressure developed in a vacuum chamber of the vacuum brake booster.

8. An exhaust emission control system for a vehicle internal combustion engine according to claim 5, wherein said required braking force correlation value determining device determines the correlation value of the required braking force based on a vehicle speed in addition to said at least one of the vehicle inclination and the stroke of the brake pedal.

9. An exhaust emission control system for a vehicle internal combustion engine according to claim 5, wherein said actual braking force correlation value detecting device detects a magnitude of an actual negative pressure developed in the air intake system of the internal combustion engine as the correlation value of the actual braking force, and
said required braking force correlation value determining device determines a magnitude of a required negative pressure as the correlation value of the required braking force from a map based on at least one of a vehicle speed, the vehicle inclination, and the stroke of the brake pedal.

10. An exhaust emission control system for a vehicle internal combustion engine according to claim 5, wherein said exhaust emission purifying promoting device is adapted to promote purification of exhaust emitted from said internal combustion engine when the internal combustion engine is cold-started.

11. An exhaust emission control system for a vehicle internal combustion engine according to claim 5, wherein said exhaust emission purifying promoting device promotes purification of exhaust by controlling the opening and closing valve to suppress flow of the exhaust in the exhaust passage of the internal combustion engine.

12. An exhaust emission control system for a vehicle internal combustion engine according to claim 5, wherein the required braking force correlation value continuously varies as said at least one of the vehicle inclination and the stroke of a brake pedal depressed by a driver changes.

13. An exhaust emission control system for a vehicle internal combustion engine, comprising:
a vacuum brake booster that supplements a vehicle braking force by utilizing negative pressure developed in an air intake system of the internal combustion engine;
an exhaust purification promoting device for promoting purification of exhaust emitted from the internal combustion engine such that the negative pressure developed in the air intake system of the internal combustion engine approximates an atmospheric pressure;

an actual braking force correlation value detecting device for detecting a correlation value of an actual braking force that can be actually generated by the vacuum brake booster;

a required braking force correlation value detecting device for detecting a required braking force correlation value of a required braking force required to be generated by the vacuum brake booster; and a restricting device for restricting the exhaust emission purification promoting operation of said exhaust emission purification promoting device when the correlation value of the required braking force detected by said required braking force correlation value detecting device is greater than the correlation value of the actual braking force detected by said actual braking force correlation value detecting device, wherein the internal combustion engine is a cylinder injection type internal combustion engine, and said exhaust emission purification promoting device is two-stage combustion device for supplying fuel into a combustion chamber such that main injection for main combustion is carried out in an intake stroke or in a compression stroke, and sub-injection is carried out from an expansion stroke, thereby increasing an exhaust gas temperature to promote exhaust purification.

14. An exhaust emission control system for a vehicle internal combustion engine according to claim 13, wherein said exhaust emission purification promoting device further includes, an exhaust flow control device for promoting exhaust purification by suppressing flow of exhaust in an exhaust passage of the internal combustion engine, and wherein said restricting device inhibits operations of both said two-stage combustion device and said exhaust flow control device when the correlation value of the required braking force detected by said required braking force correlation value detecting device is greater than the correlation value of the actual braking force detected by said actual braking force correlation value detecting device.

15. An exhaust emission control system for a vehicle internal combustion engine according to claim 13, wherein said restricting device prohibits said two-stage combustion device from carrying out the two-stage combustion when the correlation value of the required braking force detected by said required braking force correlation value detecting device is greater than the correlation value of the actual braking force detected by said actual braking force correlation value detecting device.

16. An exhaust emission control system for a vehicle internal combustion engine according to claim 15, further comprising:

a slight lean operation device for carrying out a compression slight lean operation in which fuel is supplied into the combustion chamber such that an air-fuel ratio is a slight lean air-fuel ratio in the compression stroke, thereby increasing the exhaust gas temperature to promote exhaust purification, wherein said restricting device prohibits said two-stage combustion device from carrying out the two-stage combustion and causes said slight lean operation device to carry out the compression slight lean operation.

* * * * *